(12) United States Patent
Dudley

(10) Patent No.: US 7,877,923 B2
(45) Date of Patent: Feb. 1, 2011

(54) FISHING LURES

(76) Inventor: David Dudley, 406 Briarcliff Cir., Lynchburg, VA (US) 24502

( * ) Notice: Subject to any disclaimer, the term of this patent is extended or adjusted under 35 U.S.C. 154(b) by 0 days.

(21) Appl. No.: 12/007,647

(22) Filed: Jan. 14, 2008

(65) Prior Publication Data

US 2008/0222940 A1 Sep. 18, 2008

Related U.S. Application Data

(60) Provisional application No. 60/906,219, filed on Mar. 12, 2007.

(51) Int. Cl.
*A01K 85/00* (2006.01)
*A01K 83/00* (2006.01)

(52) U.S. Cl. .................. 43/42.39; 43/44.81; 43/42.26

(58) Field of Classification Search ............... 43/44.87, 43/42.39, 42.42, 42.4, 44.81, 42.13, 42.24, 43/42.26, 42.27, 42.28, 42.37
See application file for complete search history.

(56) References Cited

U.S. PATENT DOCUMENTS

| | | | | |
|---|---|---|---|---|
| 2,125,030 A | * | 7/1938 | Ozburn | 43/42.13 |
| 2,165,734 A | * | 7/1939 | Stracener | 43/42.27 |
| 2,994,151 A | * | 8/1961 | Webb | 43/42.28 |
| 4,450,645 A | * | 5/1984 | Ancona | 43/42.25 |
| 4,887,378 A | * | 12/1989 | Sheehan et al. | 43/42.25 |
| 5,822,913 A | * | 10/1998 | Lau | 43/42 |
| 5,822,914 A | * | 10/1998 | Tadych | 43/42.39 |
| 6,772,553 B2 | * | 8/2004 | Phillips et al. | 43/42.39 |

OTHER PUBLICATIONS www.probass.com.*

* cited by examiner

*Primary Examiner*—Joshua J Michener
(74) *Attorney, Agent, or Firm*—Ditthavong Mori & Steiner, P.C.

(57) ABSTRACT

A fishing jig head to be molded with or inserted thereinto a hook thereby form a fishing jig, includes a body, a ring attached on the body, and plate(s) or prong(s) which is shaped and positioned to prevent the fishing jig from landing flat on a bottom of water after the fishing jig is cast into the water. A fishing jig includes the fishing jig head, a hook molded with or inserted into the jig head, and optionally at least one of a weed guard, a skirt, and a trailer.

17 Claims, 11 Drawing Sheets

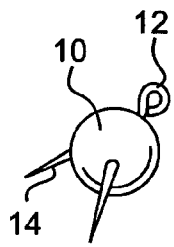
FIG. 3A
FIG. 3B
FIG. 3C
FIG. 3E
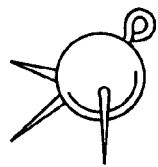
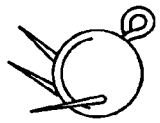
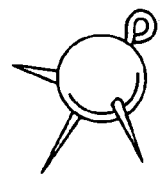
FIG. 3D
FIG. 3F
FIG. 3H
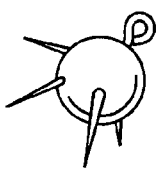
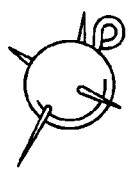
FIG. 3G
FIG. 3I

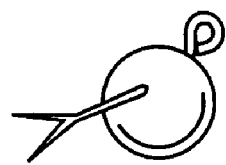
FIG. 9A
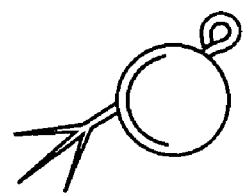   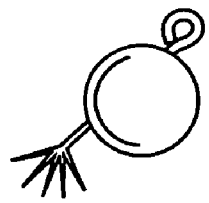
FIG. 9B          FIG. 9C

FISHING LURES

This application claims the benefit of U.S. Provisional Patent Application Ser. No. 60/906,219 filed on Mar. 12, 2007, the entire disclosures of which are incorporated herein by reference.

BACKGROUND OF THE INVENTION

1. Field of the Invention

The present invention relates to fishing lures, and more particularly to a jig having a hook molded or inserted thereinto, and a jig head with a simple standing-up supporting means for maintaining the jig along with the hook standing-up in the water after being cast into the water.

2. Description of the Prior Art

The jig fishing lure is well known, as it approximates the size and shape of a bait that would be the primary food source for the type of fish meant to be caught. A jig usually consists of a lead sinker head with a hook molded or inserted into it, and a lure inserted onto the shank of the hook. The jig is very versatile and can be used in both salt water as well as fresh water. The head of a jig can consist of many different shapes and colors along with different features as shown in FIG. 1. The most common is the round head, but others include fish head shaped, coned shaped, or the like. These heads come in many different weights usually ranging from $1/64$th of an ounce to over 1 ounce. The hooks also vary in hook types, colors, angles of the hook, materials. Some jig heads offer a weed guard. There is a wide array of bodies for jigs. The most common ones is made out of rubber or silicone in many shapes, for example, resembling a grub, a frog, a fish, a paddle tail, a lizard, or a bug. The colors of the bodies can range from bright yellow to a transparent brown with silver and red flakes. As a rule, light colors are a good choice for bright sunny days. Dark colors are best for overcast days or at night. Alternatively, the body can be a combination of feathers, fur, rubber skirts, and other materials. FIG. 2 shows how a lure is applied to a conventional jig.

Many species are attracted to the lure which has made it popular amongst anglers for years. Jig fishing is essentially fishing at or near the bottom of a body of water using a technique that involves a jiggling or dragging retrieval of the lure. Conventional jigs, or jig heads, comprise a lead weight molded onto the shank of a fishhook and painted or dressed to resemble bait in order to attract fish.

A problem of the convention jigs as shown in FIG. 1 is that they land at the bottom of the water flat so that fish is not interested. The so-called "standup" jigs (FIG. 1F) or "tipup" jigs (FIG. 1G) only stand up when stand on a flat surface before the lure is applied and being cast into water. Once they are cast into water, they land flat the in the water nine out of ten times, rather than standing up. Even if it stands up under all the required conditions such as landing on a smooth surface (rather than a rock), absence of strong current, etc, it only stands up for a few seconds. Several jigs have been developed to make the jig and the lure standing up in the water to look like a crawfish in a defensive posture thereby enticing the fish to attack the lure. Optionally, the jigs come with a weed guard (FIGS. 1H-I) arranged on the jib head and extending towards and against the hook to protect toe hook from weeds. However, the weed guards can't not prevent the jigs form landing flat in the bottom of water.

Evolution Jig™ is offered by Megastrike, Inc. (Freehold, N.J.) on-line with pending patent applications. The jigs fall horizontally into the water and land flat in a horizontal position on the skid plate, and then counter-balanced by the weight of the tin head (100% lead free) to pivot to a stand-up (generally vertical). The jigs are available in two styles: Heavy Cover Jigs in sizes: $3/8$, $1/2$, and $3/4$ oz and Finesse Jigs in sizes $3/16$, $5/16$, and $7/16$ oz. The smaller finesse type of jigs are much more effective in clear water, while the heavier, bulky versions are great for fishing stained to muddy water. The jigs are in different colors: rusty craw, midnight craw, green pumpkin, bayou craw, cinnamon, fall craw red glitter, Halloween, black blue purple, white, peanut butter & jelly, and black and blue. The flaring disc and the skid plate allow the lure to stand up looking like a crawfish in a defensive posture which entices fish to attack the lure. The rotation plate of the Evolution Jig™ merely rotates the jig to a vertical position then the jig falls right back down flat, such that the jig does not remains standing up in the water long enough before a fish sees it.

A Norman Combine™ crank bait is offered by Win Leisure Products (Greenwood, Ark.) The crank bait is a sinking lure to be fished like a jig that swims off of the bottom. The heavier the crank bait the deeper it will dive on the retrieve. A Ballast Weight hangs below the body in the shape of a fin can be moved forward and back to create wide to tight actions. A forward movement of the ballast weight will produce a wide action. Moving the weight back toward the hook will produce a tight action. The more weight you add to the hook the more the ballast weight may need to be moved forward to create action. Various Skirts, rattles and soft plastics can be used on the crank bait. The crank bait is designed to swing in the water then being retrieved without reaching the bottom of the body of water. Even if it accidentally touches the bottom, it bounces right back up from the bottom. For open water retrieval.

However, these jigs have complex designs with many parts of different materials thus cost money to produce. There is a need for a simply and cost effective design.

SUMMARY OF THE INVENTION

It is a major object of the invention to provide a fishing jig remaining standing up on the bottom of water after being cast therein, even when contacting against rocks, mud, uneven ground, logs, etc.

It is another object of the invention to provide a fishing jig which is easy to produce and remains standing up on the water after being cast therein.

Finally, it is a general goal of the invention to a fishing jig which has a simply structure, cheap to produce and remains standing up on the water after being cast therein.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein:

FIGS. 3A-I show a first embodiment of a fishing jig head and its variations according to the present invention.

FIGS. 9A-C show a third embodiment of a fishing jig head and its variations according to the present invention.

DETAILED DESCRIPTION OF THE PREFERRED EMBODIMENTS

Figure 1A:
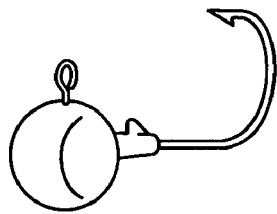
FIGS. 1A-I show a plurality of conventional fishing jigs.
Figure 1B:
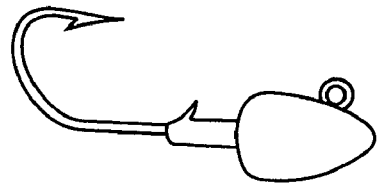
Figure 1C:
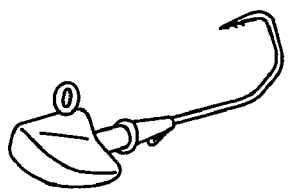
Figure 1D:
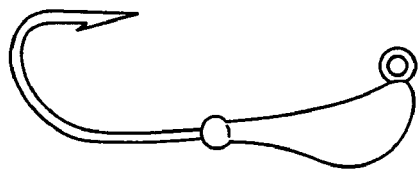
Figure 1E:
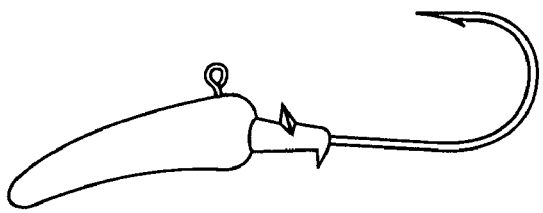
Figure 1F:
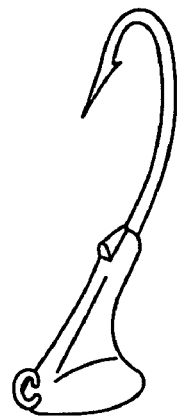
Figure 1G:
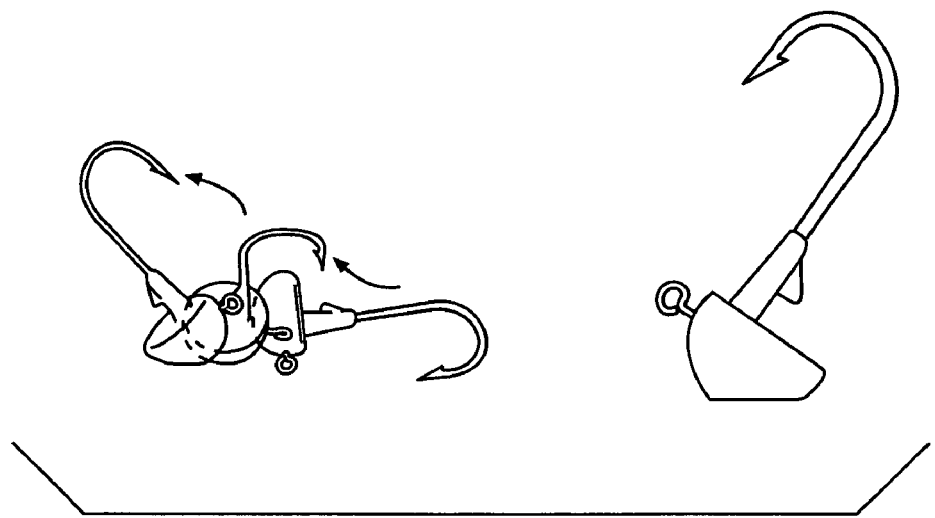
Figure 1H:
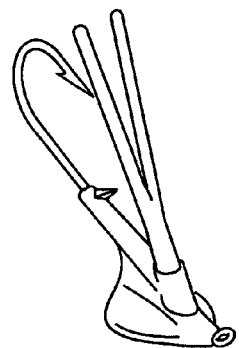
Figure 1I:
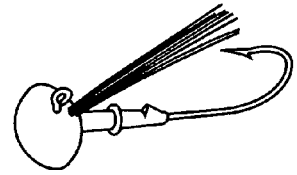
Figure 2:
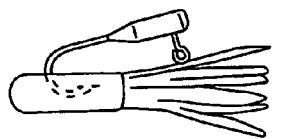
FIG. 2 shows how a lure is applied to a conventional fishing jig.
Figure 2:
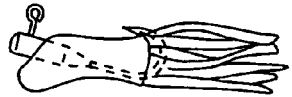
Figure 2:
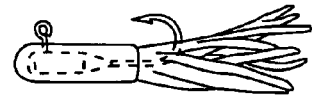
Figure 5A:
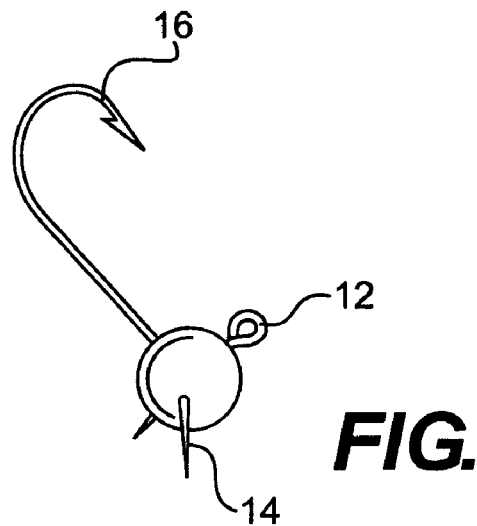
FIGS. 5A-C show fishing jigs including the jig heads of FIG. 3 and its variations according to the present invention.
Figure 5B:
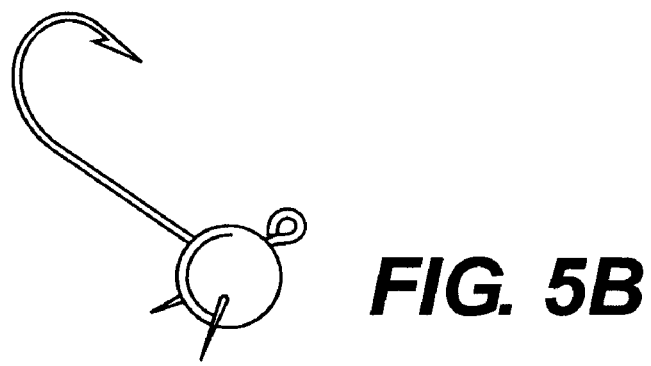
Figure 5C:
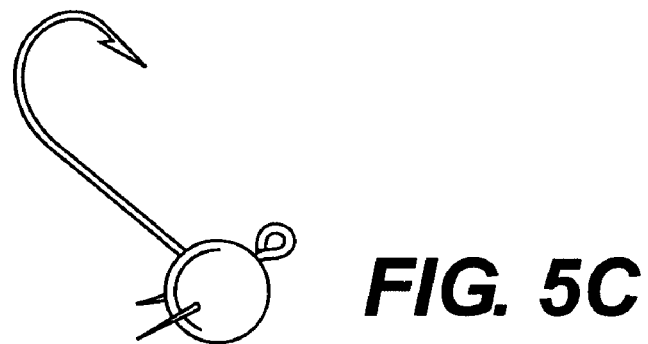

The present invention is a fishing jig head designated generally as 10 in FIG. 3. The jig head 10 is characterized by including two or more jig prongs 14 arranged away from a ring 12. The body of the jig head 10 can be of any symmetrical or non-symmetrical shapes, such as a bomb, a ball, a bowling ball, or any shapes of a prior art jig head, such as those shown in FIGS. 1-2. The prongs are arranged symmetrically or non-symmetrically, but preferably symmetrically, to the jig head 10 or to the ring 12. In addition, the prongs are fixed to be (1) leveled with (FIGS. 3C, 3F, 3I), (2) pointing above (FIGS. 3B, 3E, 3H), or (3) pointing below (FIGS. 3A, 3D, 3G), a ring plane. Alternatively, the prongs can be manually adjusted to the (1)-(3) situations. FIG. 5 shows a hook 16 molded or inserted into the jig head 10 of FIGS. 3A-C. By adjusting the prongs 14 to the (1)-(3) situations, the hook 16 stands up at different angles form the bottom of water.

Figure 4A:
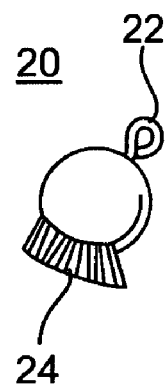
FIGS. 4A-C show a second embodiment and its variations of a fishing jig head according to the present invention.
Figure 4B:
Figure 4C:
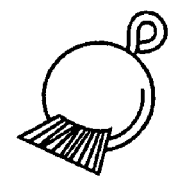
Figure 6A:
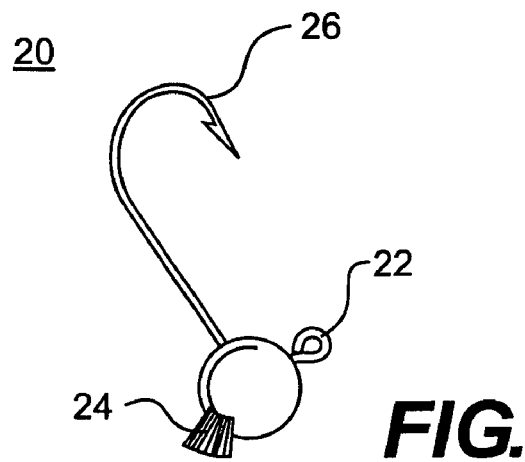
FIGS. 6A-C show fishing jigs including the jig heads of FIG. 4 and its variations according to the present invention.
Figure 6B:
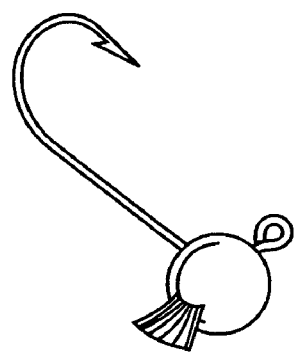
Figure 6C:
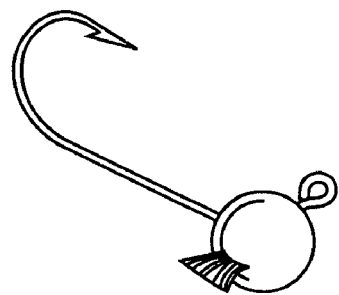
Figure 10A:
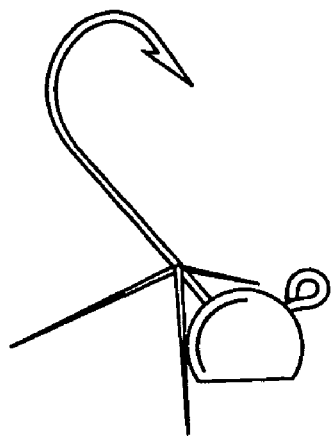
FIGS. 10A-C shows a fourth embodiment of a fishing jig and its variations according to the present invention.
Figure 10B:
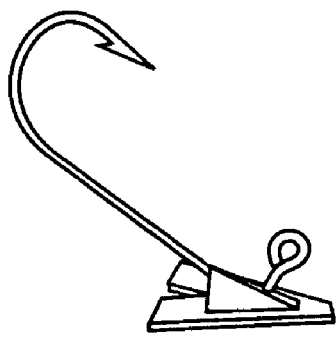
Figure 10C:
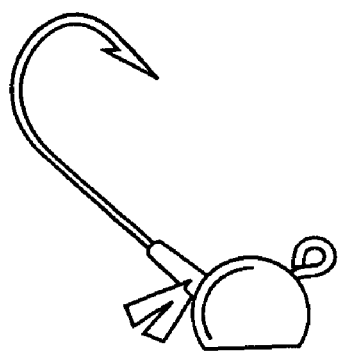

FIG. 4 shows a second embodiment according to the present invention. A fishing jig 20 include a fan or shovel 24 arranged opposite to a ring 22. Similarly, the fan or shovel 24 is fixed or adjustable to (1) level with (FIG. 4C), (2) lift above (FIG. 3B), or (3) lift below (FIG. 3A), a ring plane. FIG. 6 shows a hook 26 molded or inserted into the jig head 20 of FIGS. 3A-C. By adjusting the fan or shovel 24 to the (1)-(3) situations, the hook 16 stands up at different angles from the bottom of water. The fan or shovel 24 may be split as shown in FIG. 10C.

Figure 7A:
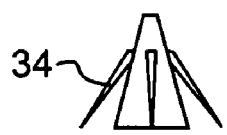
FIGS. 7A-B show a third embodiment of a fishing jig head and its jig assembly with a hook according to the present invention.
Figure 7B:
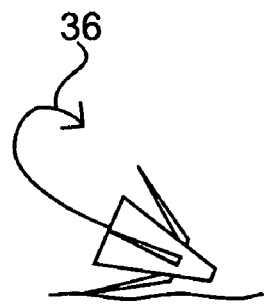
Figure 8A:
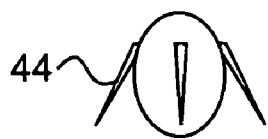
FIGS. 8A-B shows a fourth embodiment of a fishing jig head and its jig assembly with a hook according to the present invention.
Figure 8B:
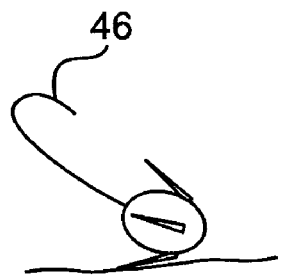

FIGS. 7-8 show another two jig heads each with a different shape and four prongs, as examples. The prongs are (1) lighter than ⅛ of the weight of the jig head and (2) at least ½ of the diameter/length of the jig heads to prevent the jig from landing flat on the bottom of the water.

FIG. 9 shows a third embodiment of a fishing jig head and its variations according to the present invention. Instead of the generally I-shaped prongs or shovel, the embodiment includes variations of one or more generally Y-shaped (FIG. 9A) or fork-shaped (FIG. 9B) prongs, or one brush-shaped or broom-shaped prong (FIG. 9C). Another exemplary variation of the shovel can be just one split in the middle. FIGS. 10A-C show the prongs, shovel or the other variations of the prongs attached to the hook or the shank of the hook above or right at the head.

Figure 11A:
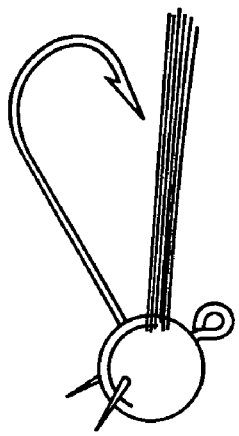
FIGS. 11A-C show weed guards, skirts and trailers applied to different embodiments of the invention.
Figure 11B:
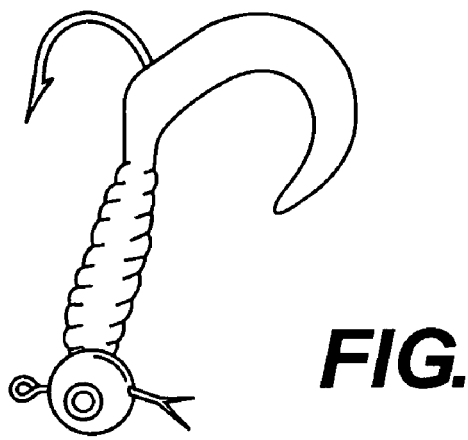
Figure 11C:
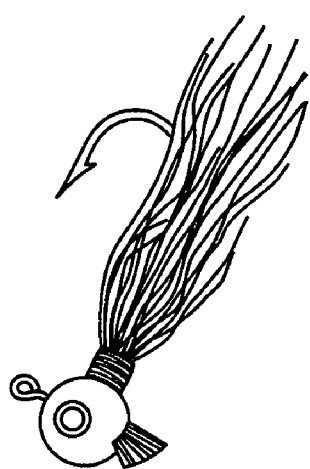

Optionally, the jig heads can be opened to replace the weight in order to vary the weight of the jig to adjust the speed at which the weight sinks and the degree of wobble during retrieval of the lure according to the type of game fish targeted, and according to the depth, bottom conditions, current, and other environmental factors relating to the waters being fished. In addition, any kinds of weed guards, skirts and trailers may be applied to the invention as shown in FIG. 11.

The jig heads can make from tungsten, lead, tin, stainless steel, hot or cold rolled steel, copper, brass, plastics, fiberglass, etc., by casting the materials into a mold, by injection molding, or by other processes. In addition, the jig body and the jig prongs/shovel can be made of different materials. For example, the jig body is made of lead, while the prongs are made by thick fish lines. A jig body is made of tungsten is smaller than the one made of lead. A jig body is made of plastic or fiberglass may be transparent. Representative dimensions for the jig head 10 include a diameter of 1/16 inches, and the prongs 14 of 1/64 inches long or longer (such as ⅛ inches in FIG. 10A), preferably longer than 1/32 inches. In other words, the length of a prong may range form ½ to 2 or more times of the diameter of the body. The fan/shovel 24 is 1/64 inches long or longer (such as 1/16 inches in FIG. 6C), preferably longer than 1/32 inches. In other words, the length of a fan/shovel may range from ½ to 1 or more times of the diameter of the body. Regarding the width of the fan/shovel, it can be 1/32 to 1/16 inches wide or wider (equivalent to ½ to 1 or more times of the diameter of the body).

The invention provide a very high percentage of success rate to stand up on the bottom of water, or even on slanted bottoms, rocks, logs, etc. The invention provides 100% of success rate to stand up on the bottom of water. The inventor tested the invention in an Olympic size pool (a flat bottom without rocks, logs, or mud sand) by a 45-ft cast to 12-foot of water. Since the Evolution Jig™ could not stand in a flat pool, it definitely would not stand in real fishing conditions. The invention stood up 10 times out of 10 casts. On the other hand, the existing competing products did not stand upon even once in 10 casts, with the hook laid completely on the bottom The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A fishing jig, comprising:
   a hook having a shank and a barb which define a first plane;
   a head;
   a ring attached on the head at a point of contact located on the first plane; and
   a support which consists of two generally I-shaped prongs attached on the head and arranged away from the ring, the support being configured to support the jig in conjunction with a point of the head against a bottom of water thereby preventing the hook from contacting the bottom of water after the jig is cast into the water and maintaining the hook standing up in the water, a center line of the support being arranged oppositely to the ring across the head,
   wherein the jig has only three points of contact with the bottom of water after the jig is cast into the water and the hook is maintained as standing up in the water, and the barb is configured to be positioned above the shank when the hook remains standing up in the water.

2. A fishing jig head according to claim 1, wherein the prongs are attached to the hook.

3. A fishing jig according to claim 1, wherein points of contacts between the head and the prongs and the point of contact between the head and the ring form a second plane, the prongs define a third plane, and the third plane is fixed to or adjustable to level with, lift above, or lift below the second plane.

4. A fishing jig according to claim 3, wherein the second plane is generally perpendicular to the first plane.

5. A fishing jig according to claim 3, wherein the second plane crosses a center of the head.

6. A fishing jig according to claim 3, wherein the second plane is in parallel with or overlaps with the third plane.

7. A fishing jig according to claim 1, wherein the prongs are soldered or inserted to the head.

8. A fishing jig according to claim 1, wherein the first plane is perpendicular to the bottom of water after the jig is cast into the water.

9. A fishing jig according to claim 1, wherein the first plane crosses a center of the head.

10. A fishing jig according to claim 1, wherein the hook is molded with or inserted into the head.

11. A fishing jig according to claim 1, wherein the head and the prongs are made of at least one of tungsten, lead, tin, stainless steel, hot or cold rolled steel, copper, brass, plastics, and fiberglass.

12. A fishing jig according to claim 1, wherein the head and the prongs are made of different materials.

13. A fishing jig according to claim 1, wherein the prongs are made of fish lines.

14. A fishing jig according to claim 1, wherein the head weights at least 1/64th of an ounce.

15. A fishing jig according to claim 1, wherein the head has a diameter of at least 1/16 inch, and the prongs are at least 1/64 inch long.

16. A fishing jig, comprising:
a hook having a shank and a barb which define a first plane;
a head;
a ring attached on the head at a point of contact located on the first plane; and
a support which consists of generally I-shaped prongs attached on the head and arranged away from the ring, the support being configured to support the jig in conjunction with a point of the head against a bottom of water thereby preventing the hook from contacting the bottom of water after the jig is cast into the water and maintaining the hook standing up in the water, a center line of the support being arranged oppositely to the ring across the head,
wherein the jig has only end points of the prongs and the point of the head contacting with the bottom of water after the jig is cast into the water and the hook is maintained as standing up in the water, and
the barb is configured to be positioned above the shank when the hook remains standing up in the water.

17. A fishing jig, consisting of:
a hook having a shank and a barb which define a first plane;
a head;
a ring attached on the head at a point of contact located on the first plane; and
a support which consists of two generally I-shaped prongs attached on the head and arranged away from the ring, the support being configured to support the jig in conjunction with a point of the head against a bottom of water thereby preventing the hook from contacting the bottom of water after the jig is cast into the water and maintaining the hook standing up in the water, a center line of the support being arranged oppositely to the ring across the head,
wherein the jig has only three points of contact with the bottom of water after the jig is cast into the water and the hook is maintained as standing up in the water, and
the barb is configured to be positioned above the shank when the hook remains standing up in the water.

* * * * *